United States Patent [19]
Borlinghaus et al.

[11] Patent Number: 5,586,740
[45] Date of Patent: Dec. 24, 1996

[54] CHUCKLESS POWER SEAT ADJUSTER SLIDE

[75] Inventors: Hans J. Borlinghaus, Mt. Clemens; James P. Nini; Thomas B. Blake, both of Clinton Township, all of Mich.

[73] Assignee: General Motors Corporation, Detroit, Mich.

[21] Appl. No.: 359,305

[22] Filed: Dec. 19, 1994

[51] Int. Cl.⁶ .................................................. F16M 11/00
[52] U.S. Cl. .......................... 248/157; 248/419; 248/424; 248/429; 297/330
[58] Field of Search .................. 248/424, 429, 248/430, 157, 419; 297/330

[56] References Cited

U.S. PATENT DOCUMENTS

| | | | |
|---|---|---|---|
| 2,875,809 | 3/1959 | Ragsdale et al. | 155/14 |
| 3,006,594 | 10/1961 | Gruendler | 248/424 |
| 3,066,907 | 12/1962 | Latimer et al. | 248/420 |
| 3,137,472 | 6/1964 | Louton, Jr. et al. | 248/371 |
| 4,015,812 | 4/1977 | Heesch | 248/394 |
| 4,344,594 | 8/1982 | Hirth | 248/421 |
| 4,533,106 | 8/1985 | Stockl | 248/421 |
| 4,756,576 | 7/1988 | Bianchi et al. | 297/325 |
| 5,046,697 | 9/1991 | Detloff et al. | 248/419 |
| 5,094,419 | 3/1992 | Nini et al. | 248/157 |
| 5,112,018 | 5/1992 | Wahls | 248/394 |
| 5,121,895 | 6/1992 | Ikegaya et al. | 248/430 |
| 5,222,402 | 6/1993 | White et al. | 74/89.14 |
| 5,398,904 | 9/1995 | Rees | 248/429 |
| 5,445,354 | 8/1995 | Gauger et al. | 248/429 |

*Primary Examiner*—Ramon O. Ramirez
*Assistant Examiner*—Michael J. Turgeon
*Attorney, Agent, or Firm*—Ernest E. Helms

[57] ABSTRACT

A powered seat adjuster slide unit is providing including a top rail for mounting a vehicle seat; a bottom rail for supporting the top rail; a guide rail pivotally joined to the top and bottom rails along generally opposite ends to stabilize the top rail; a first forward jack screw unit with a powered extendable jack screw, the first jack screw unit having pivotal axes in positions fixed with respect to the top and bottom rails; and a second rearward jack screw unit with a powered extendable jack screw, the second jack screw unit having pivotal axes in positions fixed with respect to the top and bottom rails.

7 Claims, 4 Drawing Sheets

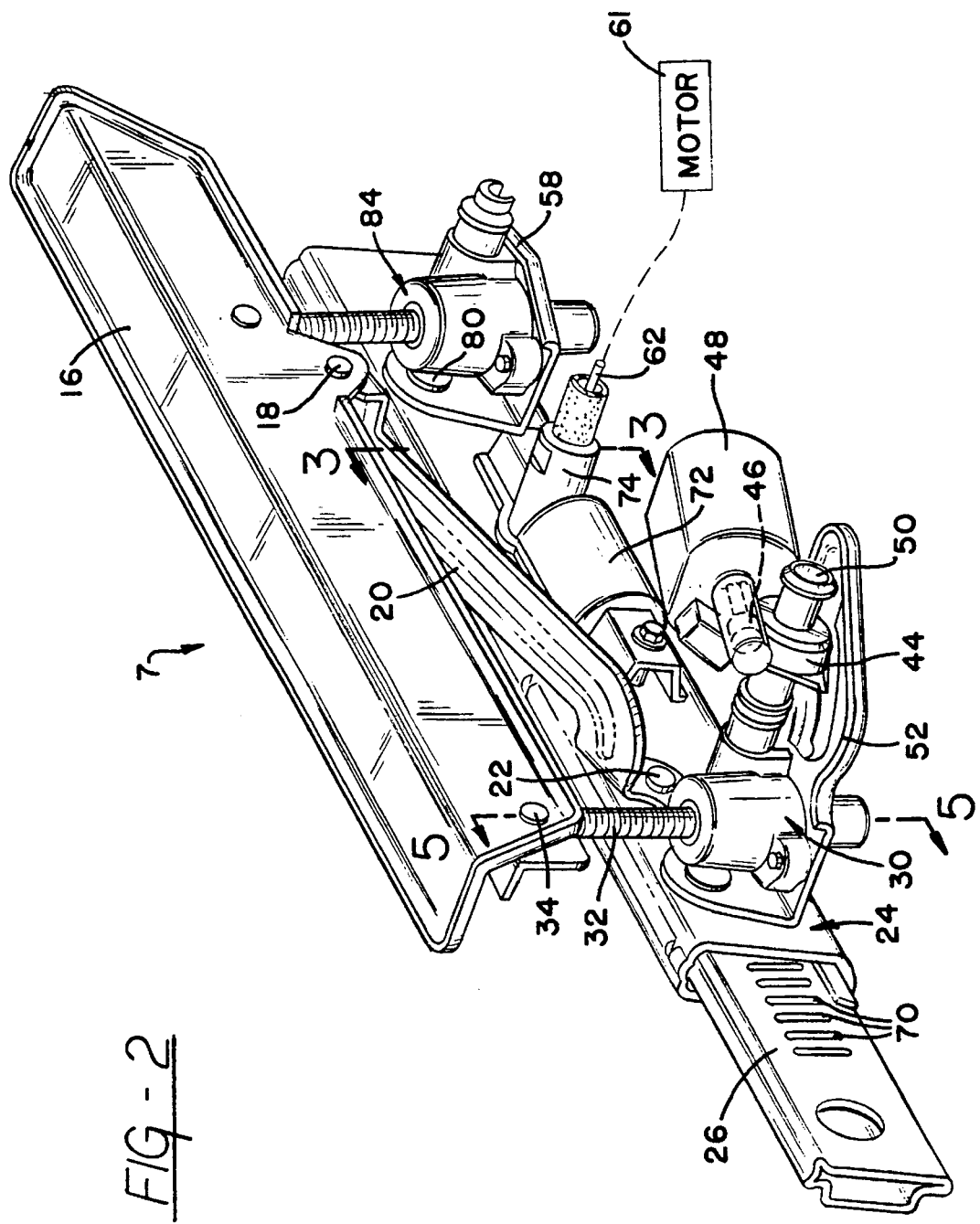

5,586,740

CHUCKLESS POWER SEAT ADJUSTER SLIDE

FIELD OF THE INVENTION

The field of the present invention is that of powered seat adjuster slides and seat adjusters for automotive vehicles, especially six-way powered seat adjusters.

BACKGROUND OF THE INVENTION

Six-way powered seat adjusters and seat adjuster slides are well known in the art. An example is Borlinghaus et al, U.S. Pat. No. 4,664,351, commonly assigned. Many, if not most, conventional powered seat adjuster slide units used in the automotive market today have a top rail which is mounted on top of a bottom rail. At the fore and aft ends of the top and bottom rails is a jack screw unit to elevate the top rail by selective vehicle operator demands. Virtually all units have a lost motion window to allow for the twisting of the parts without deformation of the metal. The lost motion window can be alleviated in certain circumstances by deletion of the jack screw unit and the utilization of dual links between the top and bottom rails, such as in U.S. Pat. No. 5,112,018. Dual links and the aforementioned lost motion windows are both undesirable because they give greater possibility for experiencing of chuck. Chuck is the motion experienced when sitting in the seat wherein the seat adjuster slightly moves due to the slack in the components. To bring about a six-way powered seat adjuster which would be more favored by the increasingly demanding customer, the present invention is brought forth.

SUMMARY OF THE INVENTION

The present invention brings forth a jack screw-type seat adjuster slide having both from and rear lift mechanisms positioned on two pivots each to achieve independent or simultaneous lift. A link which is independent of the two vertical jack screws provides stability. No lost motion or slave links are therefore required. Additionally, in a preferred embodiment of the present invention the gear and motor which power at least one of the jack screw mechanisms is connected on a platform pivotally connected to the bottom rail of the seat adjuster slide unit.

BRIEF DESCRIPTION OF THE DRAWINGS

FIG. 2 is a perspective enlarged view of the seat adjuster slide unit utilized in FIG. 1 with the vehicle seat removed for clarity of illustration showing a top rail, a guide rail, a bottom rail and a floor rail of the present invention.

DESCRIPTION OF THE PREFERRED EMBODIMENTS

Figure 1:
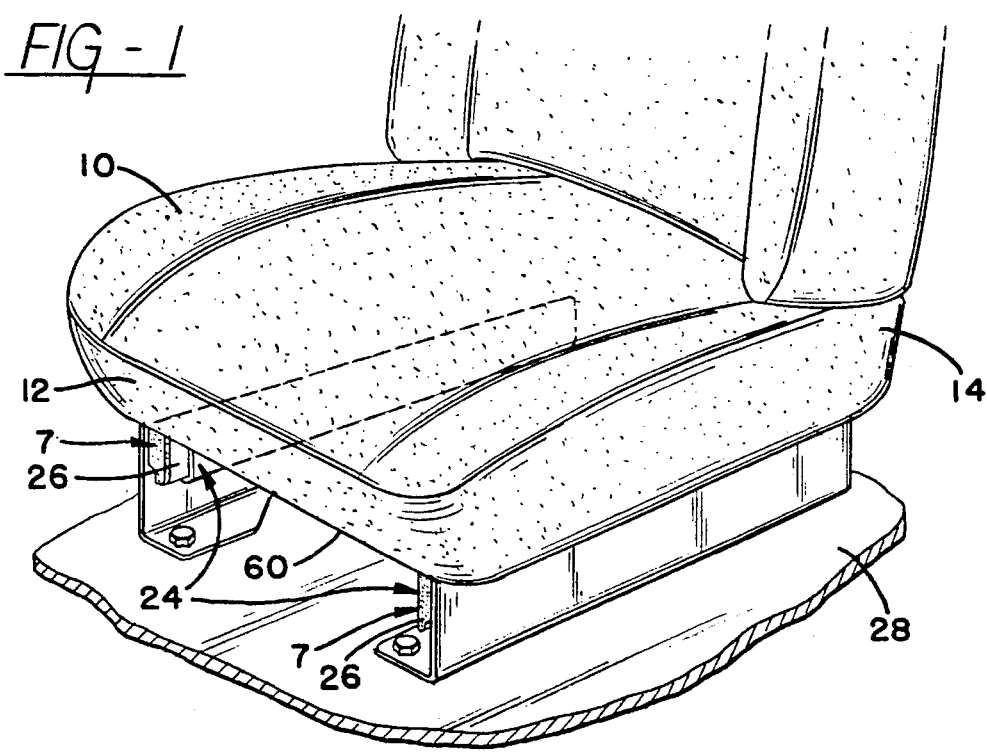
FIG. 1 is a perspective view of a vehicle seat with a seat adjuster utilizing the preferred embodiment seat adjuster slide according to the present invention.
Figure 5:
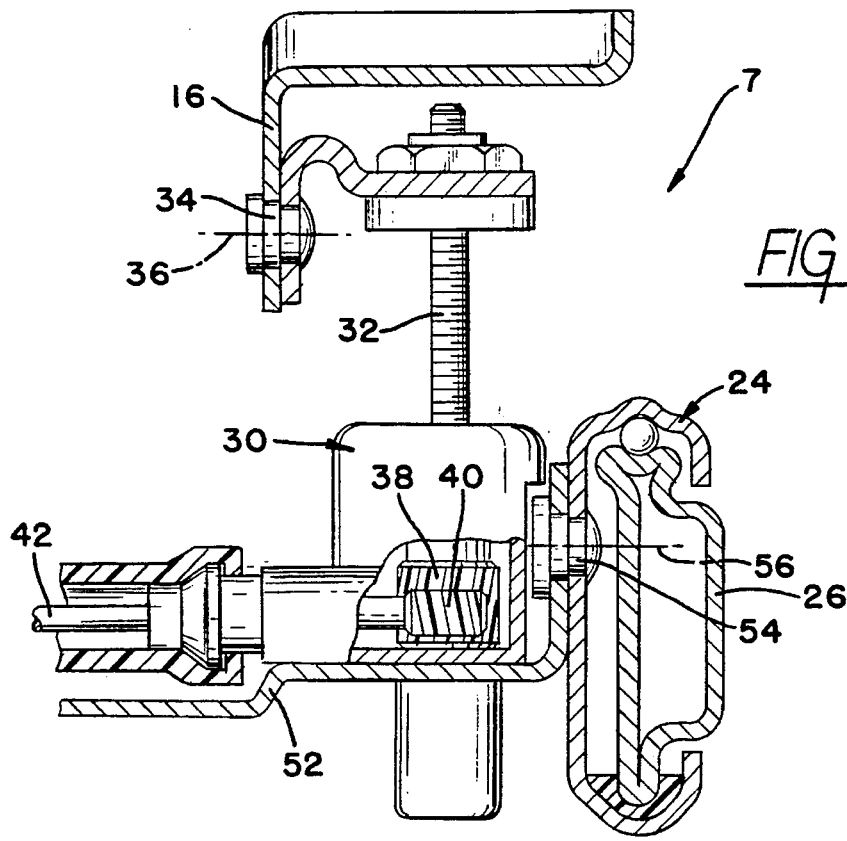
FIG. 5 is an enlarged view taken along line 5—5 of FIG. 2.
Figure 3:
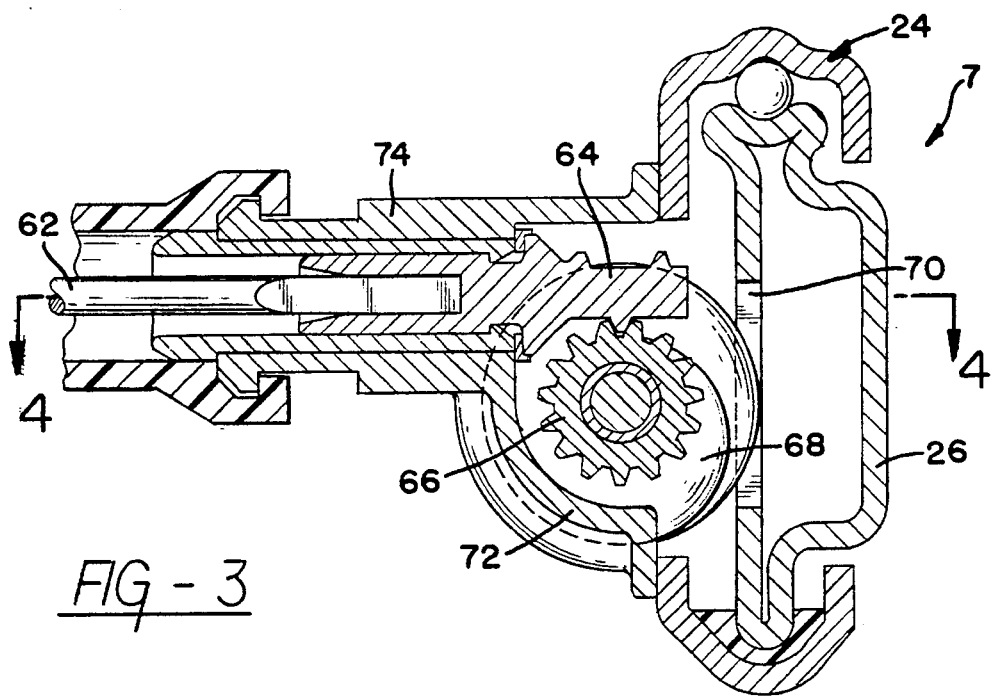
FIG. 3 is an enlarged view taken along line 3—3 of FIG. 2.
Figure 4:
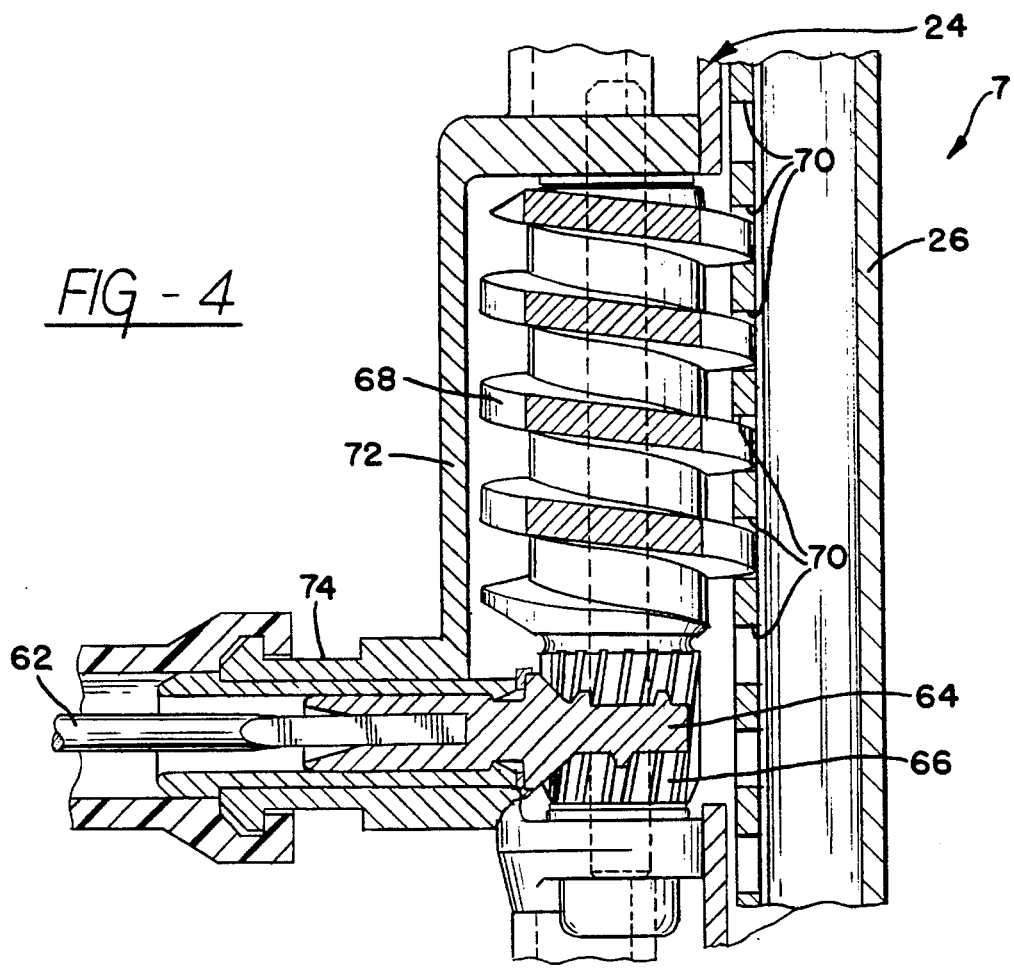
FIG. 4 is a view taken along line 4—4 of FIG. 3.

Referring to FIGS. 1–5, the seat adjuster slide unit 7 according to the present invention is shown in FIG. 1 in an environment supporting a vehicle seat 10. The seat adjuster slide unit 7 allows the vehicle seat 10 to be adjusted in a fore and aft direction and vertically up and down along the vehicle seat front end 12 and rear end 14.

To support a vehicle seat, there is provided a top rail 16. The top rail 16 is pivotally connected via a pin 18 to a guide rail 20. At an opposite end, the guide rail 20 is pivotally joined via a pin 22 to a bottom rail 24. The guide rail 20 is provided to give stability to the top rail 16, which is supported by the bottom rail 24. To allow for fore and aft movement of the seat adjuster slide unit 7, the bottom rail 24 which has a generally C-shaped cross-sectional area is slidably mounted on a floor rail 26 which is held fixed in a suitable manner with respect to a vehicle floor 28.

To set the elevation of the front end of the vehicle seat, there is a front adjuster mechanism 30. The front adjuster mechanism 30 has a nonrotative jack screw 32. The nonrotative jack screw 32 via a pin 34 has a pivotal axis 36 with the top rail 16, which is in a fixed location with respect to the top rail 16. The nonrotative jack screw 32 is encircled by a first gear 38. To power the first gear 38, there is meshed with the same a second gear 40 which has a horizontal axis of rotation. The second gear 40 is in turn powered by a cable 42 which terminates in a gear box 44. Gear box 44 is powered by a worm gear 46 which extends on a shaft to an electric motor 48. A second output end 50 of the gear box 44 is for connection to a cable (not shown) to power the front adjuster mechanism for the seat adjuster slide unit 7 on the other side of the vehicle seat (shown only in FIG. 1). The electric motor 48, the gear box 44 and the first and second gears 38 and 40 are all supported on a platform 52. Platform 52 is pivotally joined to the bottom rail 24 via a pin 54. Pin 54 therefore gives the nonrotative jack screw 32 a pivotal axis 56 which is fixed with respect to the bottom rail 24.

A rear adjuster mechanism 84 is generally identical to the operation of the front adjuster mechanism 30 with the exception that typically its platform 58 will not mount a gear box or motor, but the gear box and motor will instead be fixably connected to the underside of a seat bottom 60 of the vehicle seat 10. However, it may be connected to the platform 58 if so desired. To power the seat adjuster slide unit 7 in the fore and aft direction, the bottom rail 24 or the seat bottom 60 can mount an electric motor 61, which in turn powers a cable 62, a gear 64, a gear 66 and a worm gear 68 to mesh within slots 70 provided in the floor rail 26. The seat adjuster slide unit on the opposing side of the seat adjuster slide unit 7 may be powered in a similar fashion in the fore and aft direction by a cable (not shown) from motor 61 which feeds into an outlet 74 of a gear box 72.

Figure 6A:
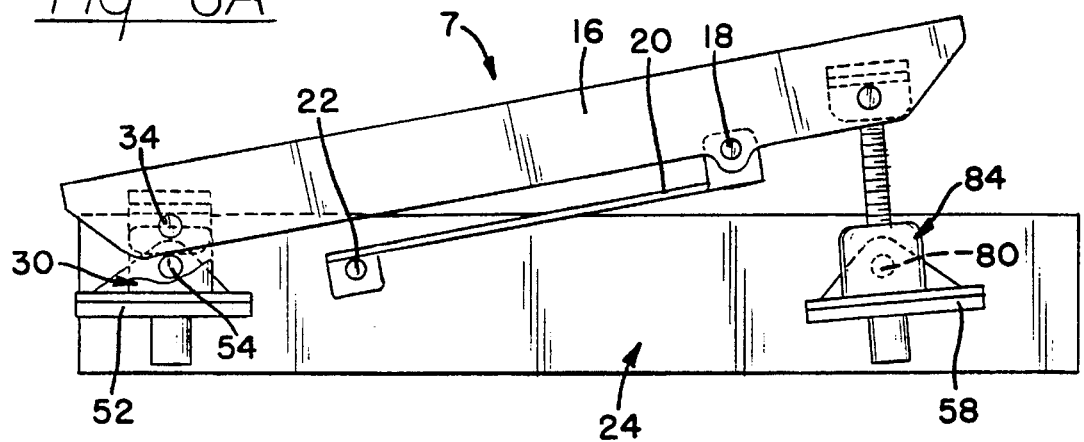
FIGS. 6A, 6B and 6C are schematic views demonstrating operation of the seat adjuster slide unit according to the present invention.
Figure 6B:
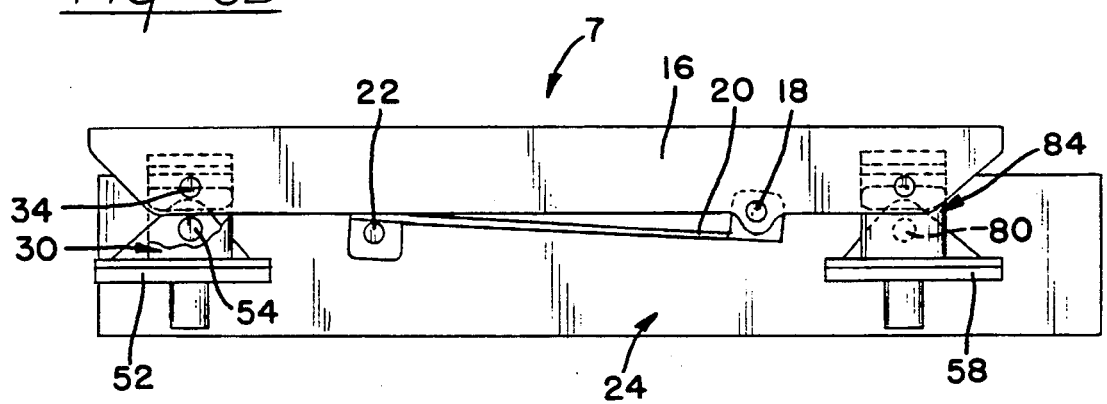
Figure 6C:
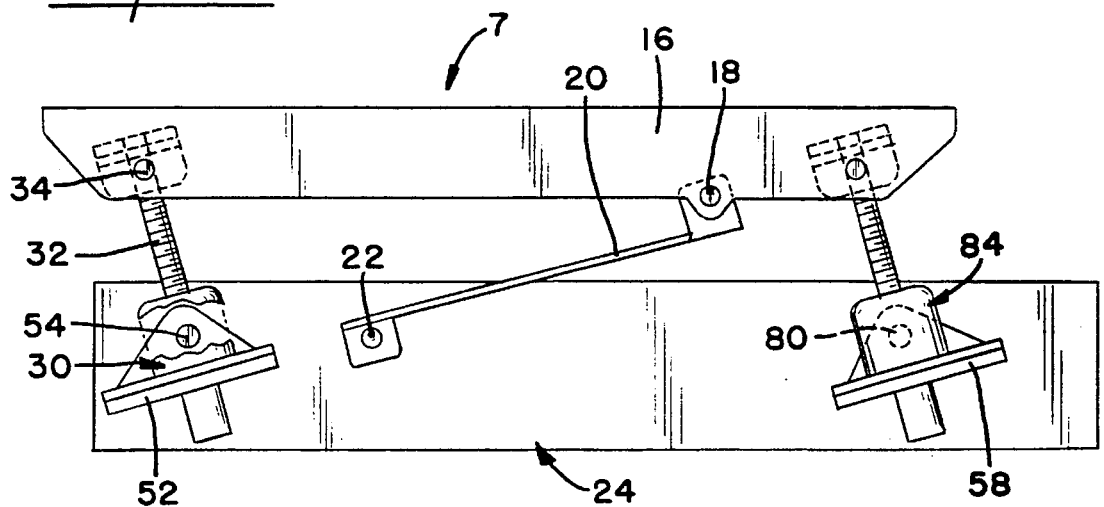

Referring to FIGS. 6A, 6B and 6C, the operation of the seat adjuster slide unit 7 is shown in 6A with the rear adjuster mechanism 84 in an extended position. It is apparent to those skilled in the art that pin 18 must travel along a fixed radius with respect to the pin 22. Therefore, when lifting up the rear end 14 in FIG. 6A, the front adjuster mechanism 30 remains stationary. To accommodate the lost motion, there is a tilt of the rear adjuster mechanism 84 about its pivotal axis of pin 80 with the bottom rail 24. When the seat adjuster slide unit 7 goes from a position shown in FIG. 6A to a position shown in FIG. 6C, the front adjuster mechanism 30 will be extended, causing the front adjuster mechanism 30 to tilt about pin 54 which mounts the front platform 52. When the seat adjuster slide unit 7 returns to its lowermost position from its uppermost position shown in FIG. 6C, both adjuster mechanism 30, 34 will be retracted downward in their downwardmost position. The platforms 52, 58 will be generally horizontal with respect to the bottom rail 24.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A four-way powered seat adjuster slide unit comprising:

a top rail for mounting a vehicle seat;

a bottom rail for supporting the top rail;

a guide rail pivotally joined to the top rail and to the bottom rail along generally opposite ends to stabilize the top rail;

a first forward jack screw unit with a powered extendable jack screw, the jack screw unit having fixed pivotal axes in positions fixed with respect to the top and bottom rails; and a second rearward jack screw unit with a powered extendable jack screw, the jack screw unit having fixed pivotal axes in positions fixed with respect to the top and bottom rails.

2. A seat adjuster slide unit as described in claim 1 wherein the jack screw is nonrotative.

3. A seat adjuster slide unit as described in claim 1 wherein the jack screw is surrounded by a first gear mounted on a platform which pivots on the bottom rail providing the pivotal axis of the jack screw with the bottom rail.

4. A seat adjuster slide unit as described in claim 3 wherein the first gear is powered by a second gear, the second gear being mounted on the platform.

5. A seat adjuster slide unit as described in claim 3 wherein the platform carries a motor that powers the jack screw.

6. A seat adjuster slide unit as described in claim 1 wherein the bottom rail is selectively mounted on a floor rail and a power gear connected to the bottom rail meshes with the floor rail to allow the bottom rail to be selectively movable in a fore and aft position with respect to a floor rail providing fore and aft adjustment of a vehicle seat.

7. A six-way powered seat adjuster slide unit comprising:

a top rail for mounting a vehicle seat;

a bottom rail for supporting the top rail;

a floor rail for slidably mounting the bottom rail in a fore and aft position;

a guide rail pivotally joined along generally opposite ends to the top tail and to the bottom rail to stabilize the top rail;

a first forward nonrotative jack screw unit, the unit being on a platform pivotally connected to the bottom rail, the unit having a nonrotative jack screw surrounded by a first gear which is in turn powered by a second gear, the second gear being powered by a motor located on the platform, the first jack screw unit having fixed pivotal axes in a position fixed with respect to the top rail and the bottom rail;

a second rearward jack screw unit with an extendable nonrotative jack screw encircled by a first gear which in turn meshes with a second gear powered by a motor, the first and second gears being on a platform having a pivotal axes with the bottom rail and the second jack screw unit having fixed pivotal axes in a position fixed with respect to the top rail and the bottom rail; and a motor fixed with the bottom rail allowing a third gear to mesh with a portion of the bottom rail for providing selective fore and aft adjustment of the adjuster slide unit.

\* \* \* \* \*